United States Patent
Babbar et al.

(10) Patent No.: US 11,038,717 B2
(45) Date of Patent: Jun. 15, 2021

(54) LABEL-BASED METHODS FOR IDENTIFYING A SOURCE LOCATION IN SERVICE CHAINING TOPOLOGY

(71) Applicant: VMware, Inc., Palo Alto, CA (US)

(72) Inventors: Mansi Babbar, Fremont, CA (US); Subin Cyriac Mathew, San Jose, CA (US); Chidambareswaran Raman, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 101 days.

(21) Appl. No.: 16/566,350

(22) Filed: Sep. 10, 2019

(65) Prior Publication Data
US 2021/0075641 A1  Mar. 11, 2021

(51) Int. Cl.
*H04L 12/46* (2006.01)
*H04L 29/12* (2006.01)
*G06F 9/455* (2018.01)
*H04L 29/06* (2006.01)

(52) U.S. Cl.
CPC ...... *H04L 12/4633* (2013.01); *G06F 9/45545* (2013.01); *H04L 12/4641* (2013.01); *H04L 61/6022* (2013.01); *H04L 69/22* (2013.01); *G06F 2009/45595* (2013.01)

(58) Field of Classification Search
CPC ............. H04L 12/4633; H04L 12/4641; H04L 61/6022; H04L 69/22; G06F 9/45545; G06F 2009/45595
See application file for complete search history.

(56) References Cited

U.S. PATENT DOCUMENTS

| | | | | |
|---|---|---|---|---|
| 2016/0036728 A1* | 2/2016 | Duda | ................. | H04L 12/4641 370/357 |
| 2016/0330046 A1* | 11/2016 | Yang | ..................... | H04L 45/586 |
| 2019/0020679 A1* | 1/2019 | Qu | ......................... | H04L 45/74 |

OTHER PUBLICATIONS

Benjamin Schmaus "What isGeneve:?", dated Jun. 22, 2017, 4 pages.
P. Quinn, Ed. et al., "Network Service Header (NSH)", dated Jan. 2018, 40 pages.

\* cited by examiner

*Primary Examiner* — Kyaw Z Soe (57) ABSTRACT

In an embodiment, a computer-implemented method provides mechanisms for identifying a source location in a service chaining topology. In an embodiment, a method comprises: determining, at an egress interface of a host that hosts a virtual machine ("VM"), whether a service plane MAC address ("spmac") in a packet header of a packet, provided to the egress interface, is the same as an inner destination MAC address in the packet; in response to determining that the spmac in the packet header of the packet, provided to the egress interface, is the same as the inner destination MAC address in the packet: encapsulating the packet with a destination virtual tunnel endpoint ("VTEP") address retrieved from a mapping of VTEP-labels onto VTEP addresses; and causing providing the packet from the egress interface of the host that hosts the VM to a source host that hosts a source guest virtual machine ("GVM").

20 Claims, 7 Drawing Sheets

LABEL-BASED METHODS FOR IDENTIFYING A SOURCE LOCATION IN SERVICE CHAINING TOPOLOGY

BACKGROUND

Software defined networking ("SDN") typically supports a variety of networking services, such as network monitoring solutions, intrusion detection services ("IDS"), intrusion prevention services ("IPS"), and the like. The services may be provided by service virtual machines ("SVMs") implemented in computer hosts. The services may be inserted into a packet processing path and consumed by guest virtual machines ("GVMs") supported by the computer hosts. A GVM is a virtualized computing instance or a workload executed on a computer host.

A packet originated by a GVM, also referred to as a source GVM, may be serviced by one or more SVMs. If several SVMs sequentially apply their services to the packet, then the sequentially operating SVMs are referred to as an SVM service chain.

Since SVMs of a service chain could be instantiated on multiple hosts and the hosts supporting the SVMs may be different than a host on which a source GVM is instantiated, the SVMs need to learn a location of a source host that hosts the source GVM in a network so that the serviced packet, if it is not dropped, can be returned by a last SVMs in the service chain back to the source host to allow forwarding of the packet toward the packet's destination.

One way to learn the location of the source GVM in the network is to generate periodic broadcasts, or the Reverse Address Resolution Protocol ("RARP") messages. However, this approach may be inefficient and bandwidth-demanding.

SUMMARY

In an embodiment, mechanisms for determining a location of a source host that hosts a source GVM in a service chaining topology are presented. A source GVM is a GVM that originated a packet which in turn is serviced by one or more SVMs of a service chain. The mechanisms allow the SVMs in the chain to encapsulate the serviced packet in such a way so that, if the serviced packet is not dropped, the last SVM in the chain can retrieve, from the serviced packet, enough data that allows the last SVM to determine the location of the source host of the source GVM, and thus to return the serviced packet to the host that hosts the source GVM. An example implementation of this service chain architecture and forwarding behavior is described in detail in U.S. patent application Ser. No. 16/445,064, filed Jun. 18, 2019 and entitled, "Specifying Service Chains," which is incorporated herein by reference in its entirety.

To be able to return a serviced packet to a source host that hosts a source GVM, a last SVM in a chain needs to know a location of the source GVM. Typically, determining the location of the source GVM by the last SVM in the chain is difficult because the source GVM may be implemented on a host that is different than the host(s) on which the SVMs are implemented. However, the mechanisms described herein allow the SVMs to determine the location of the source GVM without generating periodic broadcasts to find the GVM's host. After processing by the SVMs, the serviced, non-dropped packet needs to include a MAC address of the source GVM in an inner header, and an address of the source host as a source address in an outer header.

In an embodiment, a location of a source GVM includes, for example, both an IP address and a MAC address of a virtual tunnel endpoint ("VTEP") to which the source GVM is connected in the network. The VTEP to which the source GVM is connected is referred to as a source VTEP.

In an embodiment, an IP address and a MAC address of a source VTEP are determined using a source-VTEP-label approach. This approach utilizes labels that are assigned to the VTEPs by a management plane ("MP") when the VTEPs are configured in the network. The labels may be represented using, for example, hexadecimal strings.

The MP usually assigns a unique label, an IP address and a MAC address to every VTEP in the network. The mappings between the labels and the IP/MAC addresses for the VTEPs may be obtained from the MP by local control planes executing on computer hosts. The mappings may be stored in any type of data structures, including data tables. The tables may include, for example, the associations between the VTEP labels and the IP/MAC addresses of the corresponding VTEPs.

In an embodiment, the source-VTEP-label approach includes mechanisms for SVMs included in a service path to learn a source-VTEP-label of a source VTEP of a source GVM and carry the source-VTEP-label in an outer header of a packet as the packet is provided to the SVMs. The source-VTEP-label may be initially added to the packet by a hypervisor executing on the host for the source GVM (i.e., the source host) when the packet is encapsulated, and the source host sends the packet to a first SVM in a service chain. The source-VTEP-label may be carried in, for example, an option field of a Geneve header which is one of the outer headers of the packet. Alternatively, the source-VTEP-label may be carried in other option fields of other outer headers of the packet.

To allow SVMs to carry a source-VTEP-label in an outer header of a packet, an SVM learns and preserves the source-VTEP-label from the outer header of the packet as the packet is received on an ingress interface of the host that hosts the SVM, and uses the learned source-VTEP-label to encapsulate the packet when the packet is put on an egress interface of the host. More specifically, since the host that host the SVM discards an outer header of a received packet when the packet is decapsulated, the host learns the source-VTEP-label extracted from the packet when the packet is received on an ingress interface of a source host. Then, the SVM services the decapsulated packet. If the packet is not dropped, then the learned source-VTEP-label is inserted in a Geneve option field of the packet to allow the packet to carry the source-VTEP-label. This allows the SVM to either provide the packet to a next SVM in the service chain or, if the SVM is the last SVM in the chain, to return the serviced packet to the source host of the source GVM.

In an embodiment, the process of learning a source-VTEP-label on an ingress interface and using the source-VTEP-label on an egress interface is repeated by each host hosting an SVM in a service path. If the packet is not dropped by the SVMs, then a host of the last SVM in the path determines, based on the learned source-VTEP-label, the address of a source VTEP of a source host of the source GVM, and encapsulates the serviced packet using that address. Then, the encapsulated packet is put on an egress interface to return the serviced packet to the source host that hosts the service GVM.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
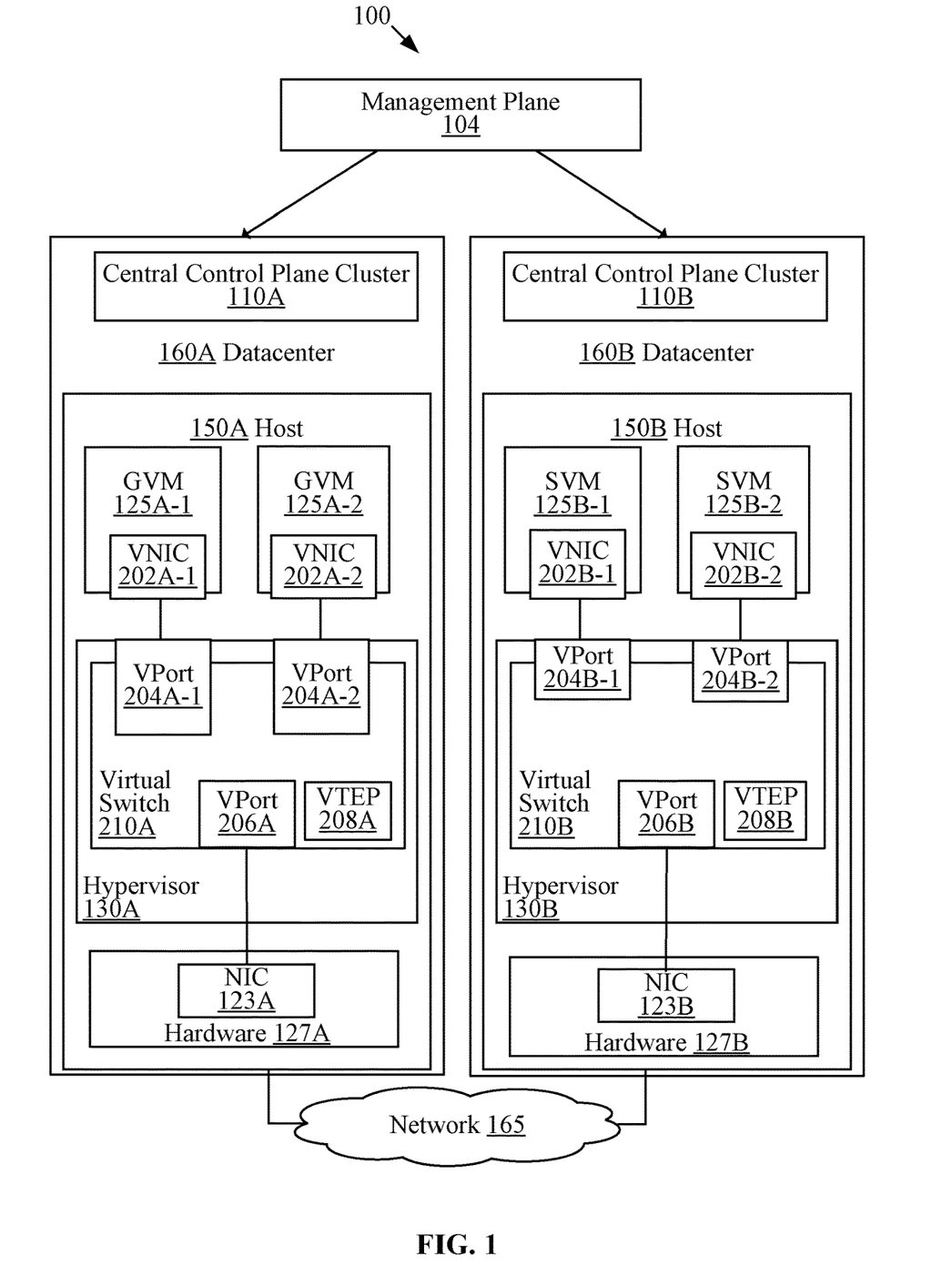
FIG. 1 is a block diagram depicting an example physical implementation view of an example logical network environment for realizing mechanisms for identifying a source location in a service chaining topology.

FIG. 1 is a block diagram depicting an example physical implementation view of an example logical network environment for realizing mechanisms for identifying a source location in a service chaining topology. The depicted example comprises a system 100 that includes an MP 104, a plurality of datacenters 160A-160B and a computer network 165.

MP 104 may include multiple computing devices that implement management plane functions. MP 104 may be responsible for receiving network configuration input through an application programming interface ("API"), a command-line interface, and/or a graphical user interface. The network configuration input may specify, for example, how multiple VMs executing on the hosts of datacenters 160A-160B may communicate with each other. The network configuration input may include, for example, MAC addresses and IP addresses of virtual networking elements implemented in datacenters 160A-160B.

In an embodiment, datacenter 160A/160B includes a central control plane ("CCP") cluster 110A/110B that manages datacenter 160A/160B, respectively. Each CCP cluster 110A/110B may include a plurality of control planes to provide redundancy, reliability, fault tolerance, and load balance.

Datacenters 160A-160B may also include hosts 150A-150B. Although FIG. 1 shows that host 150A has only GVMs and host 150B has only SVMs, and shows the two hosts in separate datacenters having separate control planes, in alternate embodiments, a particular host may have one or more SVMs and/or one or more GVMs, and any number of hosts may reside in the same datacenter or may be distributed across any number of datacenters. However, for performance-related reasons, it may be preferred to implement SVMs on hosts separate from the hosts implementing GVMs.

Hosts 150A-150B may be referred to as computing devices, host computers, host devices, physical servers, server systems, or physical machines. The hosts may include hardware components such as commodity hardware computing platforms including computing processors, memory units, physical network interface cards, and storage devices (not shown).

In an embodiment, hosts 150A-150B are physical computing devices that support the execution of one or more GVMs 125A-1, 125A-2, and one or more SVMs 125B-1, 125B-2, respectively. Hosts 150A-150B are configured with virtualization layers, referred to herein as hypervisors 130A-130B, respectively. Hypervisor 130A abstracts a processor, memory, storage, and networking resources of a corresponding hardware platform into multiple GVMs 125A-1, 125A-2. Hypervisor 130B abstracts a processor, memory, storage, and networking resources of a corresponding hardware platform into multiple SVMs 125B-1, 125B-2.

Architectures of hypervisors 130A-130B may vary. In some embodiments, hypervisor 130A/130B is installed as a bare-metal installation directly on the host 150A/150B and interposed between the physical hardware and the guest operating systems executing in GVMs 125A-1, 125A-2 and SVMs 125B-1, 125B-2. In other embodiments, hypervisor 130A/130B is implemented as an additional layer on the top of a conventional host operating system.

GVMs 125A-1, 125A-2 and SVMs 125B-1, 125B-2 are examples of virtualized computing instances or workloads. A virtualized computing instance may include an addressable data compute node or an isolated user space instance, often referred to as a name space container.

GVM 125A-1/125A-2 comprises a software-based VNIC 202A-1/202A-2, respectively, that may be configured by a local control plane (not shown) running on host machine 150A. VNICs 202A-1 and 202A-2 provide network access for GVMs 125A-1 and 125A-2, respectively. VNICs 202A-1 and 202A-2 are typically connected to corresponding virtual ports, such as ports 204A-1, 204A-2, respectively, of a virtual network switch 210A. Virtual switch 210A is a forwarding element implemented in software by hypervisor 130A.

SVM 125B-1/125B-2 comprises a software-based VNIC 202B-1/202B-2, respectively, that may be configured by a local control plane (not shown) running on host machine 150B. VNICs 202B-1 and 202B-2 provide network access for SVMs 125B-1 and 125B-2, respectively. VNICs 202B-1 and VNIC 202B-2 are typically connected to corresponding virtual ports, such as ports 204B-1 and 204B-2, respectively, of a virtual network switch 210B. Virtual switch 210B is a forwarding element implemented in software by hypervisor 130B.

Hardware 127A/127B of host 150A/150B, respectively, includes hardware components such as one or more processors (not shown), a system memory unit (not shown), a storage system (not shown), I/O devices, and a network interface ("NIC") 123A/123B, respectively. NIC 123A/123B enables host 150A/150B, respectively, to communicate with other devices via a communication medium, such as network 165. NIC 123A/123B may be used to transmit data from virtual port 206A/206B, respectively, to and from network 165.

2. Example Process for Servicing a Packet by Service Virtual Machines

Figure 2:
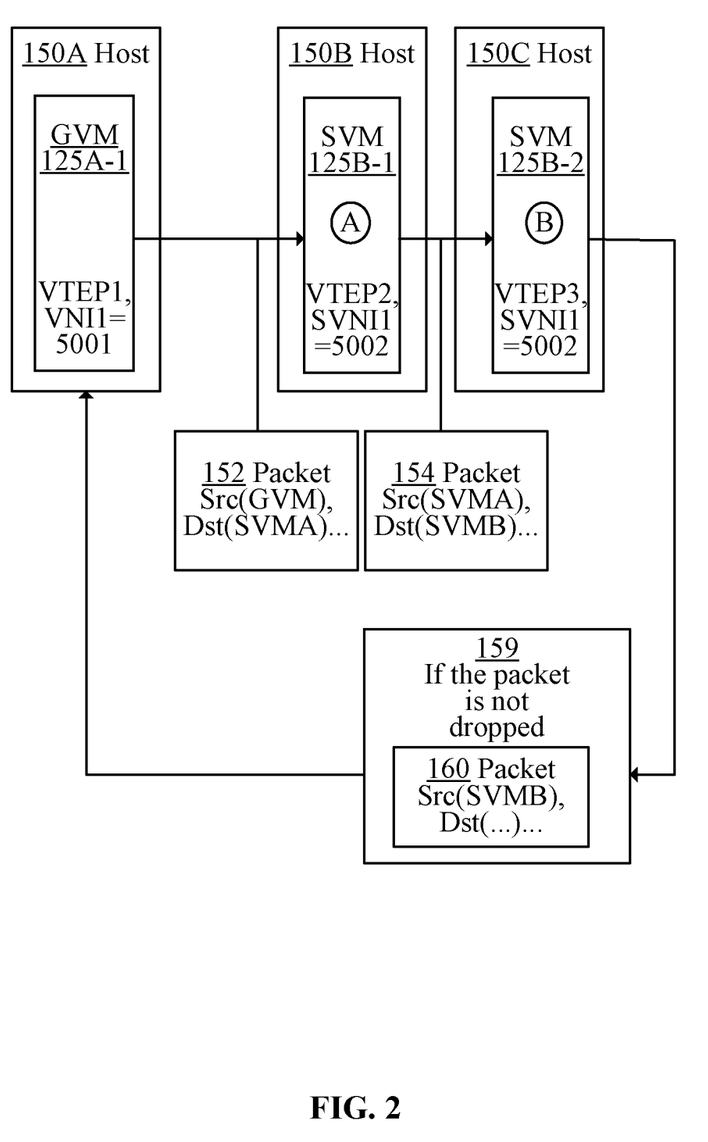
FIG. 2 is a block diagram depicting an example process for servicing a packet by service virtual machines.

FIG. 2 is a block diagram depicting an example process for servicing a packet by service virtual machines. Suppose that GVM 125A-1 is a source GVM that originated a packet that needs to be serviced by one or more SVMs, such as SVMs 125B-1 and 125B-2. SVM 125B-1 is referred to as "A," and SVM 125B-2 is referred to as "B." In other examples, not depicted in FIG. 2, the packet may be serviced by more than two SVMs.

Suppose that source GVM 125A-1 wants to send a packet to another GVM (both GVMs communicating via one overlay network), and is assigned "VNI1: GVM MAC to VTEP1," where VNI1 is 5001. Suppose that SVMs 125B-1 and 125B-2 are implemented in another overlay network, and that SVM 125B-1 is assigned "SVNI1: SVMA MAC to VTEP2," where SVNI1 is 5002; while SVM 125B-2 is assigned "SVNI1: SVMB MAC to VTEP3."

Suppose that a packet originated by source GVM 125A-1 needs to be serviced first by SVM 125B-1. To send the packet to SVM 125B-1, which is implemented on a host other than the host on which GVM 125A-1 is implemented, the source host for GVM 125A-1 encapsulates the packet with a plurality of headers to form a packet 152. A source of packet 152 is GVM 125A-1, while a destination of packet 152 is SVM 125B-1. An example of packet 152 is described in FIG. 4.

Upon receiving packet 152, SVM 125B-1 services packet 152. If the packet is not dropped and if the next SVM is on a different host, then the host for SVM 125B-1 encapsulates a resulting packet with a plurality of headers to form a packet 154. A source of packet 154 is SVM 125B-1, while a destination of packet 154 is SVM 125B-2. An example of packet 154 is described in FIG. 4. If SVM "A" and SVM "B" are on the same host, then encapsulation is not needed, and the host simply passes the packet from SVM "A" to SVM "B". This is true each time a packet is passed between GVMs and/or SVMs on the same host.

Upon receiving packet 154, SVM 125B-2 services packet 154. If the packet is not dropped (as shown in an element "159"), the host for SVM 125B-2 tries to encapsulate a resulting packet with headers to form a packet 160. A source of packet 160 is known; it is SVM 125B-2. However, assuming that GVM 125A-1 and SVM 125B-2 are implemented in different hosts, a destination VTEP address for packet 160 is not readily known to the host of SVM 125B-2 because the VTEP information of the VTEP1 of the source host to which GVM 125A-1 is connected is not readily available to the host of SVM 125B-2. The host for SVM 125B-2 may, however, obtain that information using the VTEP-label-based process described later in FIG. 5.

3. VTEP Labels

Figure 3:
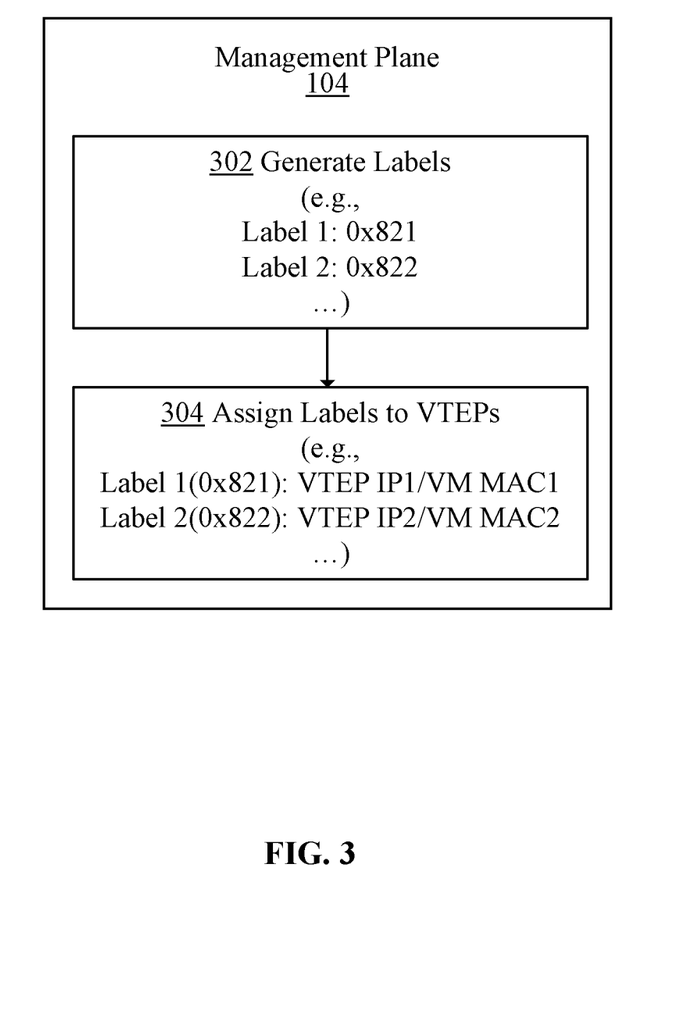
FIG. 3 is a block diagram depicting examples of labels assigned to virtual tunnel endpoints.

FIG. 3 is a block diagram depicting examples of labels assigned to virtual tunnel endpoints. In the depicted example, MP 104 generates (step 302) labels for VTEPs. Examples of the VTEPs are depicted in FIG. 1 and include VTEP 208A and VTEP 208B. Each VTEP is associated with a unique label. The way the labels are encoded depends on the implementation. In one implementation, the labels are encoded using hexadecimal strings.

In the example depicted in FIG. 3, the labels include a label 1 encoded as 0x821 and a label 2 encoded as 0x822. Additional labels and different ways of encoding the labels may be also implemented.

In an embodiment, MP 104 also assigns (step 304) IP addresses and MAC addresses to the VTEPs and associates the labels with the corresponding IP/MAC addresses of the VTEPs. In the example depicted in FIG. 3, the label 1 is associated with a VTEP IP1/MAC1 address pair, while the label 2 is associated with a VTEP IP2/MAC2 address pair. Additional labels may be associated with additional IP/MAC address pairs for additional VTEPs.

4. Carrying a Source-Vtep-Label in Packets Along a Service Path

In an embodiment, a virtual distributed layer 2 ("VDL2") host automatically appends a VTEP-label of the host in a Geneve option field of a Geneve header to every packet that is sent out from a VM implemented in the host. Hence, if the packet is sent from a source GVM to a first SVM of a service path, then a source VDL2 host that hosts the source GVM automatically appends its own VTEP-label in a Geneve option field of the Geneve header to the packet. However, if the packet is sent from a first SVM to a next SVM, then a VDL2 host that hosts the first SVM would automatically append its own VTEP-label, not a VTEP-label of the host that hosts the source GVM. Thus, the automatically appended VTEP-labels would not allow preserving, or carrying, the source-VTEP-label of the source host that hosts the source GVM in the packets along the service path. The presented approach, however, ensures that the appended VTEP label is a source-VTEP-label of a host that hosts a source GVM, so that the source-VTEP-label of the host that hosts the source GVM is carried by the SVMs along the service path.

Figure 4:
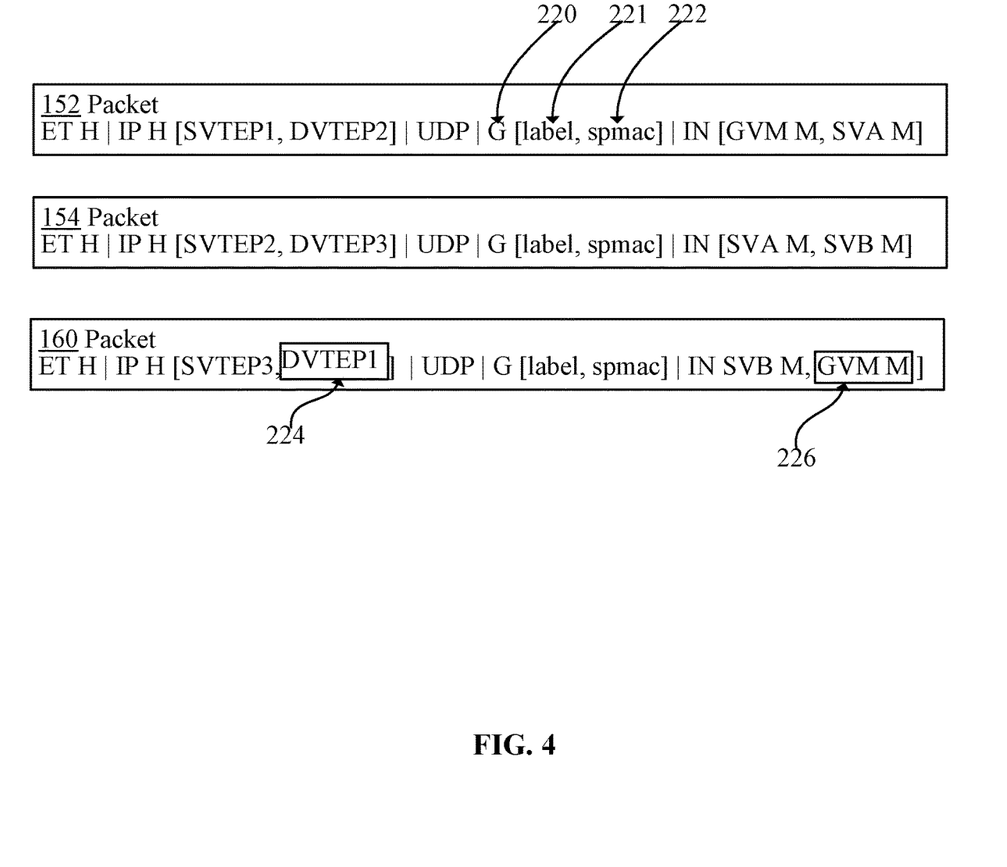
FIG. 4 includes examples of packet headers of packets serviced by service virtual machines.

FIG. 4 includes examples of packet headers of packets serviced by service virtual machines. The depicted examples include packets 152, 154 and 160, briefly described in FIG. 2. FIG. 4 provides additional information about packets 152, 154 and 160. For the clarity of the descriptions, only some of the headers of packets 152, 154 and 160 are described in FIG. 4, and the names of the headers depicted in FIG. 4 are abbreviated.

Example packet 152 comprises outer headers and inner headers (a payload is not shown). The outer headers comprise an Ethernet header, an IP header, a UDP header, a Geneve header 220, and other headers (not shown). The IP header stores, among other things, a source VTEP1 address ("SVTEP1") of the VTEP1 to which GVM 125A-1 is connected, and a destination VTEP2 address ("DVTEP2") of the VTEP2 of SVM 125B-1. Geneve header 220 may store, in its option field, a source-VTEP-label 221 and a service plane MAC address ("spmac") 222. Spmac 222 is a MAC address of GVM 125A-1. The inner headers store, among other things, a GVM MAC address as a source MAC address, and an SVA MAC address of SVM 125B-1 as a destination MAC address. The remaining content of packet 152 is omitted herein as irrelevant to the approach disclosed herein.

Example packet 154 comprises outer headers and inner headers, as packet 152. However, the IP header of packet 154 stores, among other things, a source VTEP2 address ("SVTEP2") of the VTEP2 of SVM 125B-1, and a destination VTEP3 address ("DVTEP3") of the VTEP3 of SVM 125B-2. The Geneve header may store, in its own option field, the source-VTEP-label and the spmac, which is the MAC address of source GVM 125A-1. The inner headers store, among other things, an SVA MAC address of SVM 125B-1 as a source MAC address, and an SVB MAC address of SVM 125B-2 as a destination MAC address. The remaining content of packet 154 is irrelevant to the approach disclosed herein.

Example packet 160 comprises outer headers and inner headers, as packet 154. However, the inner headers of packet 160 store, among other things, an SVC MAC address of SVM 125B-2 as a source MAC address, and an GVM MAC address 226 (which is known) of GVM 125A-1 as a destination MAC address. The outer headers comprise an Ethernet header, an IP header, a UDP header, a Geneve header, and other headers (not shown). The Geneve header may store, in its option field, the source VTEP-label and the spmac. The IP header stores, among other things, a source VTEP3 address ("SVTEP3") of the VTEP3 of SVM 125B-2. However, a destination DVTEP1 224 of the VTEP1 of GVM 125A-1 is unknown to the host of SVM 125B-2. The host of SVM 125B-1 may, however, determine DVTEP1 224 using the approach described in FIG. 5.

5. Example Approaches for Carrying a Source-Vtep-Label

Figure 5:
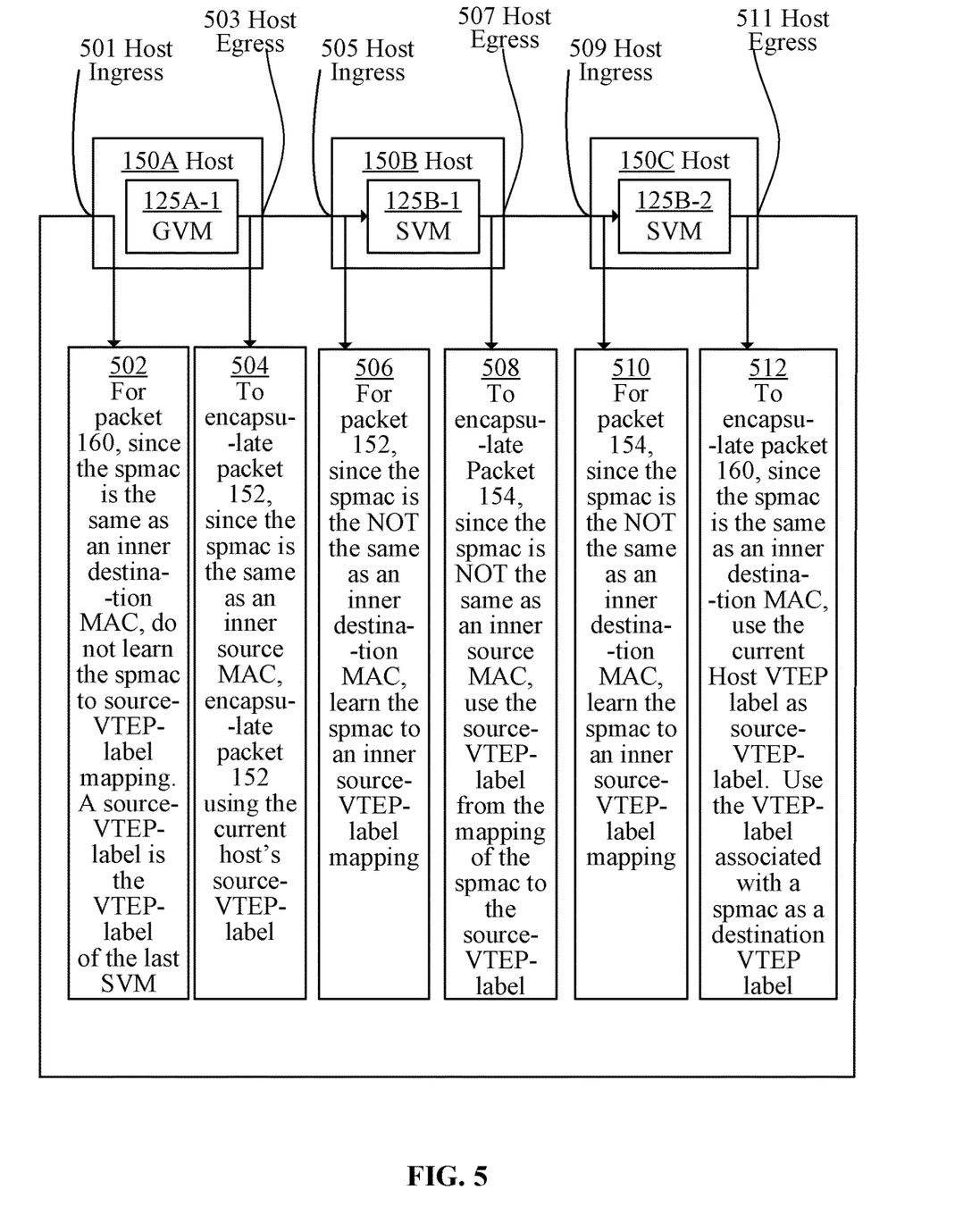
FIG. 5 is a block diagram depicting an example label-based process for identifying a source location in service chaining topology.

FIG. 5 is a block diagram depicting an example label-based process for identifying a source location in service chaining topology. FIG. 5 is described herein starting from an egress processing on an egress interface 503 of host 150A as a packet is being sent from GVM 125A-1 to SVM 125B-1. The description ends at an ingress processing on ingress interface 501 of host 150A as the serviced packet is returned from a last SVM in a service chain to host 150A. The steps may be performed by, for example, a hypervisor implemented in a host hosting a VM. For a clarity of the description, the steps are described as performed by a host.

5.1. Egress Processing at a Source Host

Suppose that source GVM 125A-1, executed on host 150A, originated a packet. Suppose that the packet requires processing by SVMs 125B-1 and 125B-2 (SVM 125B-1 is executing on host 150B, while SVM 125B-2 is executing on a host 150C). In other examples, additional SVMs may be included between SVM 125B-1 and SVM 125B-2 in a service chain. Suppose that the packet leaving source GVM 125A-1 corresponds to packet 152 depicted in FIG. 4.

On egress 503, a spmac in appended in an option field of a Geneve header of the packet. The spmac is the same as an inner source MAC address because they both correspond to the MAC address of GVM 125A-1. Since the spmac is the same as the inner source MAC address, in step 504, the packet is encapsulated with a current host's source VTEP-label. The encapsulated packet is then received on an ingress 505 of host 150B hosting SVM 125B-1.

5.2. Ingress Processing at a Host Hosting a First SVM in a Service Chain

In an embodiment, the packet detected on ingress 505 of host 150B hosting SVM 125B-1 comprises an outer header that includes a Geneve header, which includes at least the spmac and the source-VTEP-label of the source VTEP to which source GVM 125A-1 is connected.

On ingress 505, host 150B of SVM 125B-1 determines whether to learn (i.e., determine and store) a mapping between the spmac and the source-VTEP-label. The process is described in FIG. 6A.

Figure 6A:
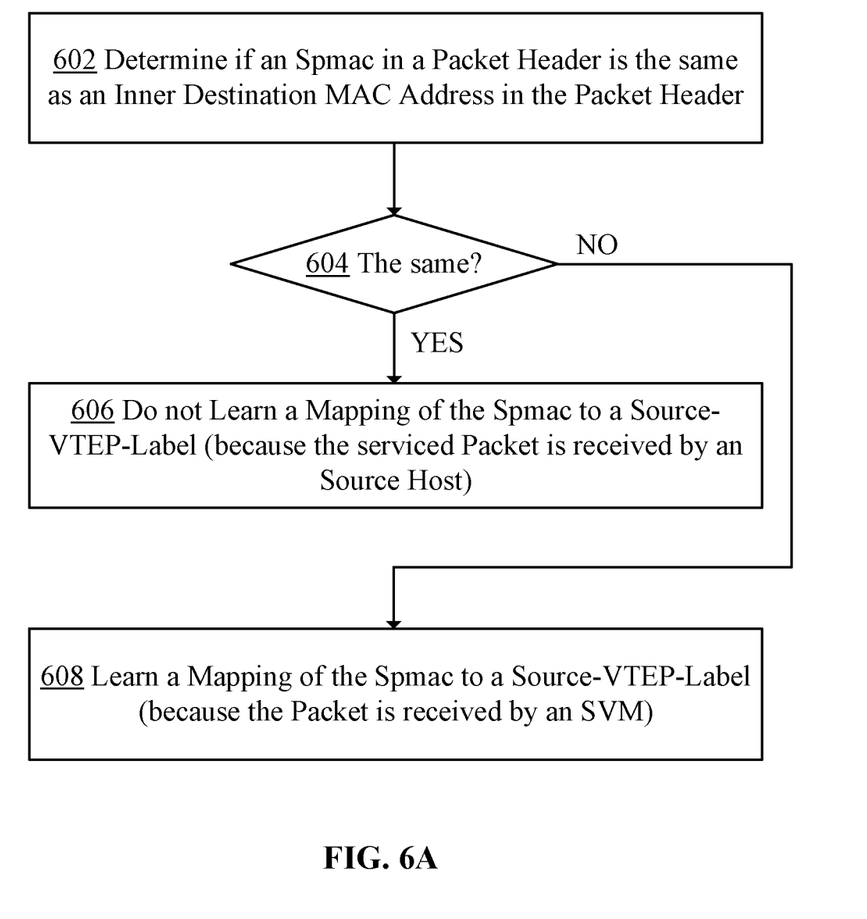
FIG. 6A is an example flow chart for label-based process for an ingress process for identifying a source location in service chaining topology.

FIG. 6A is an example flow chart for label-based process for an ingress process for identifying a source location in service chaining topology. In step 602, host 150B of SVM 125B-1 determines whether the spmac address stored in the Geneve header is the same as an inner destination MAC address included in the inner packet header.

If, in step 604, host 150B of SVM 125B-1 determines that the spmac and the inner destination MAC address are the same, then host 150B of SVM 125B-1 proceeds to performing step 606, in which host 150B of SVM 125B-1 would not learn a mapping between the spmac to a source-VTEP-label. Otherwise host 150B of SVM 125B-1 proceeds to performing step 608, in which host 150B of SVM 125B-1 does learn the spmac to the source-VTEP-label mapping.

In our example, SVM 125B-1 is a first SVM, not a last SVM, in a service path. Thus, the spmac address cannot be the same as the inner destination MAC address. This is because the spmac is the address of the GVM 125A-1, while the inner destination MAC address of the packet is the address of the SVM 125B-1. Hence, host 150B of SVM 125B-1 proceeds to step 608.

In step 608 of FIG. 6A (and step 506 of FIG. 5), host 150B of SVM 125B-1 learns a mapping between the spmac and the source-VTEP-label, both extracted from, for example, the Geneve option field of the packet's Geneve header. Host 150B of SVM 125B-1 will use that mapping later, i.e., once the packet is serviced and not dropped.

Once SVM 125B-1 finishes servicing the packet and determines that the packet is not dropped, the packet is put on an egress interface 507.

5.3. Egress Processing at a Host Hosting a First SVM in a Service Chain

On egress path 507, host 150B of SVM 125B-1 determines how to encapsulate the serviced packet. It is assumed that the packet is not dropped. The process is described in FIG. 6B.

Figure 6B:
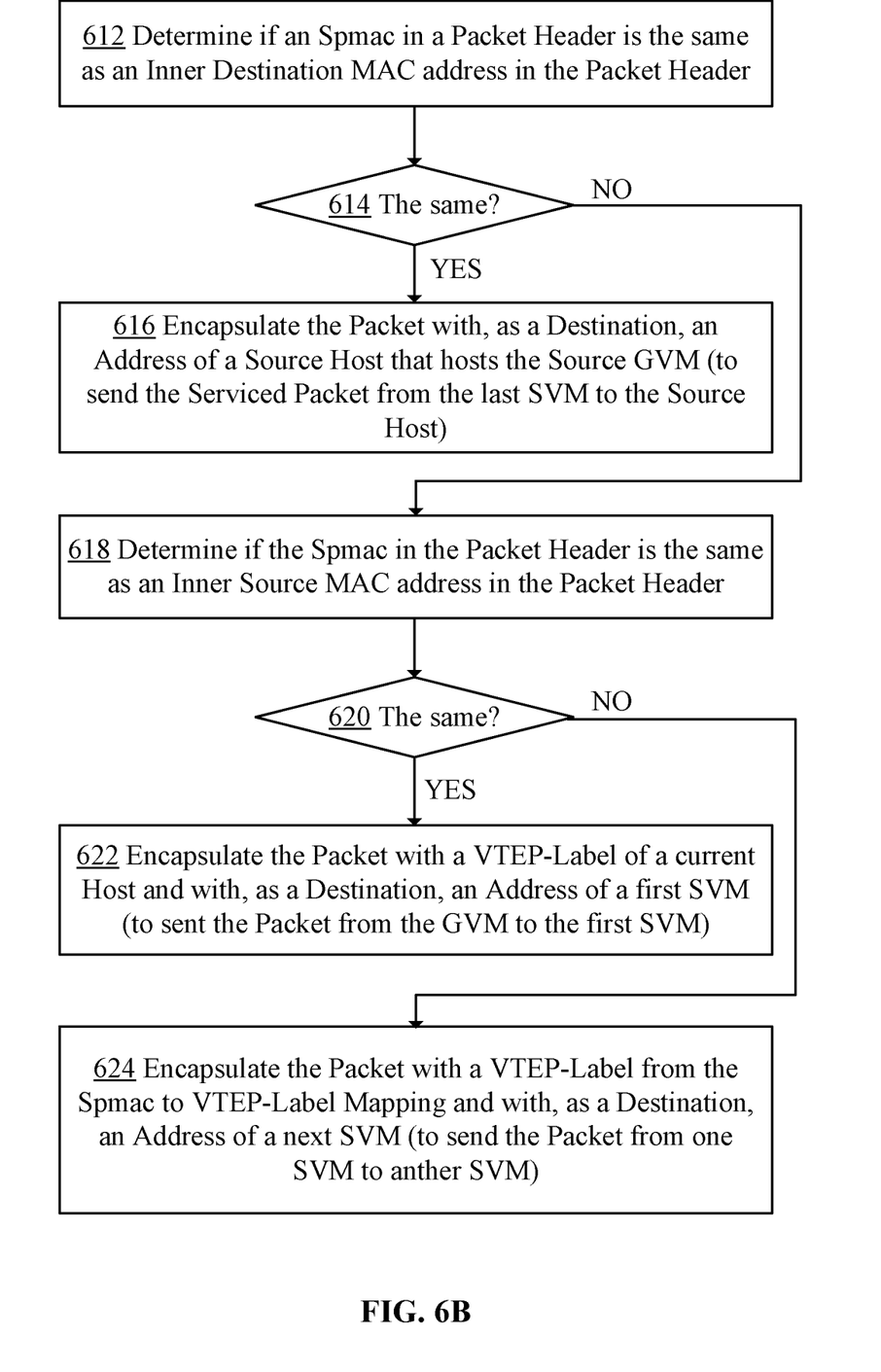
FIG. 6B is an example flow chart for label-based process for an egress process for identifying a source location in service chaining topology.

FIG. 6B is an example flow chart for label-based process for an egress process for identifying a source location in service chaining topology. In step 612, host 150B of SVM 125B-1 determines whether the spmac address in, for example, an option field of the Geneve header of the packet is the same as an inner destination MAC address included in the inner packet header.

If, in step 614, host 150B of SVM 125B-1 determines that the spmac and the inner destination MAC address are the same, then host 150B of SVM 125B-1 would proceed to performing step 616, which applies only to the last SVM in the service path. Otherwise, host 150B of SVM 125B-1 proceeds to performing step 618, which applies to all SVMs other than the last SVM in the service path.

Since SVM 125B-1 is not the last SVM in a service path for a packet, the spmac address cannot be the same as the inner destination MAC address. This is because the spmac is the address of the GVM 125A-1, while the inner destination MAC address is the address of the SVM 125B-2. Hence, host 150B of SVM 125B-1 proceeds to step 618.

In step 618, host 150B of SVM 125B-1 determines whether the spmac address in, for example, a Geneve packet header is the same as an inner source MAC address included in the inner packet header. If, in step 620, host 150B of SVM 125B-1 determines that the spmac and the inner source MAC address are the same, then host 150B of SVM 125B-1 would proceed to performing step 622, which applies only to the source GVM. Otherwise, host 150B of SVM 125B-1 proceeds to performing step 624, which applies to all SVMs other than the source GVM (and the last SVM in the service path).

Since SVM 125B-1 is not the GVM, the spmac address cannot be the same as the inner source MAC address. This is because the spmac is the address of the GVM 125A-1, while the inner source MAC address is the address of the SVM 125B-1. Hence, host 150B of SVM 125B-1 proceeds to step 624.

In step 624 of FIG. 6B (and step 508 of FIG. 5), host 150B of SVM 125B-1 stores, in an option field of the Geneve header of the packet, a source-VTEP-label derived from the learned mapping between the spmac and the source-VTEP-label learned in step 608. Host 150B also encapsulates the packet with a destination VTEP address (found using a typical approach and a typical VTEP table), as the packet's destination address, and puts the encapsulated packet on egress 507. Then, the packet is detected on an ingress interface 509 of host 150C of SVM 125B-2.

5.4. Ingress Processing at a Host of a Next SVM in a Service Chain

Suppose that the packer is received, from SVM 125B-1, on ingress interface 509 of host 150C of SVM 125B-2. On ingress 509, host 150C of SVM 125B-2 determines whether to learn a mapping between the spmac and the source-VTEP-label stored in, for example, a Geneve header. The process is described in FIG. 6A.

In step 602, host 150C of SVM-125B-2 determines whether the spmac address, stored in a Geneve packet header, is the same as an inner destination MAC address included in the inner packet header. Here, the spmac address cannot be the same as the inner destination MAC address because the spmac is the address of the GVM 125A-1, while the inner destination MAC address is the address of the SVM 125B-2. Hence, host 150C of SVM 125B-2 proceeds to step 608.

In step 608 of FIG. 6A (and step 510 of FIG. 5), host 150C of SVM 125B-2 learns a mapping between the spmac and the source-VTEP-label, both extracted from, for example, an option field of the Geneve header of the packet. Host 150C of SVM 125B-2 may use that mapping later, i.e., once the packet is serviced and not dropped.

Once SVM 125B-2 finishes servicing the packet and determines that the packet is not dropped, the packet is put on an egress interface 511.

5.5. Egress Processing at a Host of a Next SVM in a Service Chain

On egress path 511, host 150C of SVM 125B-2 determines how to encapsulate the serviced packet. The process is described in FIG. 6B. In step 612, host 150C of SVM 125B-2 determines whether the spmac address is the same as an inner destination MAC address included in the inner packet header.

If, in step 614, host 150C of SVM 125B-2 determines that the spmac and the inner destination MAC address are the same, then host 150C of SVM 125B-2 proceeds to performing step 616, which applies only to the last SVM in the service path. Otherwise, host 150C of SVM 125B-2 would proceed to performing step 618, which applies to SVMs other than the last SVM in the service path.

Here, SVM 125B-2 is the last SVM in the service path for the packet originated in GVM 125A-1. Thus, the spmac address is the same as the inner destination MAC address as they both correspond to the MAC address of the GVM 125A-1. Hence, host 150C of SVM 125B-2 proceeds to step 616.

In step 616 of FIG. 6B (and step 512 of FIG. 5), host 150C of SVM 125B-2 encapsulates the packet with a destination-VTEP-label retrieved from the mapping learned from the spmac to source-VTEP-label mapping, and with a VTEP-label, as a source, of the host on which SVM 125B-2 executes. This is because SVM 125B-2 is the last SVM in the service path and thus, to return the packet to host 150A of GVM 125A-1, the packet needs to be encapsulated with the VTEP-label of the GVM 125A-1 as a destination. The encapsulated packet is put on egress 511. Then, the packet is detected on an ingress interface 501 of host 150A of GVM 125A-1.

5.6. Ingress Processing at a Host of a Source Guest Virtual Machine

In an embodiment, host 150A hosting GVM 125A-1 receives a packet on ingress path 501. The packet comprises an outer header that includes a Geneve header which includes at least the spmac. An inner destination MAC address included in the packet corresponds to the MAC address of GVM 125A-1.

The ingress processing on ingress 501 may include performing steps 602, 603 and 606 described in FIG. 6A. Specifically, in step 606 of FIG. 6A (and step 502 of FIG. 5), host 150A of GVM 125-1 determines that the spmac and the inner destination MAC address are the same, and thus, host 150A of GVM 125-1 does not learn a mapping between the spmac to the source-VTEP-label. Host 150A of GVM 125-1 does not need to learn that mapping because the packet has been already serviced by the SVMs and returned to host 150A of GVM 125-1, and thus there is no need to redirect the packet to the service chain again. At this point, the serviced packet is successfully returned to host 150A of GVM 125-1.

6. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

7. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for identifying a source location of a packet-originating guest virtual machine in a service chaining topology, the method comprising:
   determining, at an egress interface of a host that hosts a virtual machine ("VM"), whether a service plane MAC address ("spmac") in a packet header of a packet, provided to the egress interface, is the same as an inner destination MAC address in the packet;
   in response to determining that the spmac in the packet header of the packet, provided to the egress interface, is the same as the inner destination MAC address in the packet:
      encapsulating the packet with a destination virtual tunnel endpoint ("VTEP") address retrieved from a mapping of VTEP-labels onto VTEP addresses; and
      causing providing the packet from the egress interface of the host that hosts the VM to a source host that hosts a source guest virtual machine ("GVM").

2. The computer-implemented method of claim 1, further comprising:
   in response to determining that the spmac in the packet header of the packet, provided to the egress interface, is not the same as the inner destination MAC address in the packet:
      determining, at the egress interface of the host that hosts the VM, whether the spmac in the packet header of the packet, provided to the egress interface, is the same as an inner source MAC address in the packet header;
      in response to determining that the spmac in the packet header of the packet, provided to the egress interface, is the same as the inner source MAC address in the packet header:
         encapsulating the packet with a source VTEP-label of the host; and
         causing providing the packet from the egress interface of the host that hosts the VM to a first service host that hosts a first service virtual machine ("SVM") in a service chain.

3. The computer-implemented method of claim 2, further comprising:
   in response to determining, at the egress interface of the host that hosts the VM, that the spmac in the packet header of the packet, provided to the egress interface, is not the same as the inner source MAC address in the packet header:
      encapsulating the packet with a source VTEP-label retrieved the mapping of VTEP-labels onto VTEP addresses; and
      causing providing the packet from the egress interface of the host that hosts the VM to a second service host that hosts a second SVM of the service chain.

4. The computer-implemented method of claim 3, wherein encapsulating the packet with a label comprises including the label in an option field of a Geneve header and adding the Geneve header to the packet; wherein the service chain includes one or more SVMs configured to service the packet; and wherein the service chain includes at least the first SVM.

5. The computer-implemented method of claim 4, wherein the VTEP-label is generated and assigned to a VTEP by a management plane; and wherein the source VTEP-label is associated with a MAC address and an IP address of the VTEP.

6. The computer-implemented method of claim 5, further comprising:
   determining, at an ingress interface of the host that hosts the VM, whether the spmac in the packet header of the packet, provided to the ingress interface, is not the same as an inner destination MAC address in the packet;
   in response to determining that the spmac in the packet header of the packet, provided to the ingress interface, is not the same as the inner destination MAC address in the packet:
      learning the mapping of the spmac to the VTEP-label; and
      causing providing the packet from the ingress interface of the host that hosts the VM to the VM of the service chain.

7. The computer-implemented method of claim 6, further comprising:
   in response to determining, at the ingress interface of the host that hosts the VM, that the spmac in the packet header of the packet, provided to the ingress interface, is the same as the inner destination MAC address in the packet:
      omitting learning the mapping of the spmac to the VTEP-label; and
      causing providing the packet from the ingress interface of the host that hosts the VM to the GVM.

8. One or more non-transitory computer-readable storage media storing one or more computer instructions which, when executed by one or more processors, cause the one or more processors to perform:
   determining, at an egress interface of a host that hosts a virtual machine ("VM"), whether a service plane MAC address ("spmac") in a packet header of a packet, provided to the egress interface, is the same as an inner destination MAC address in the packet;
   in response to determining that the spmac in the packet header of the packet, provided to the egress interface, is the same as the inner destination MAC address in the packet:
      encapsulating the packet with a destination virtual tunnel endpoint ("VTEP") address retrieved from a mapping of VTEP-labels onto VTEP addresses; and
      causing providing the packet from the egress interface of the host that hosts the VM to a source host that hosts a source guest virtual machine ("GVM").

9. The one or more non-transitory computer-readable storage media of claim 8, storing additional instructions for:
   in response to determining that the spmac in the packet header of the packet, provided to the egress interface, is not the same as the inner destination MAC address in the packet:
      determining, at the egress interface of the host that hosts the VM, whether the spmac in the packet header of the packet, provided to the egress interface, is the same as an inner source MAC address in the packet header;
      in response to determining that the spmac in the packet header of the packet, provided to the egress interface, is the same as the inner source MAC address in the packet header:
         encapsulating the packet with a source VTEP-label of the host; and
         causing providing the packet from the egress interface of the host that hosts the VM to a first service host that hosts a first service virtual machine ("SVM") in a service chain.

10. The one or more non-transitory computer-readable storage media of claim 9, storing additional instructions for:
in response to determining, at the egress interface of the host that hosts the VM, that the spmac in the packet header of the packet, provided to the egress interface, is not the same as the inner source MAC address in the packet header:
encapsulating the packet with a source VTEP-label retrieved the mapping of VTEP-labels onto VTEP addresses; and
causing providing the packet from the egress interface of the host that hosts the VM to a second service host that hosts a second SVM of the service chain.

11. The one or more non-transitory computer-readable storage media of claim 10, wherein encapsulating the packet with a label comprises including the label in an option field of a Geneve header and adding the Geneve header to the packet; wherein the service chain includes one or more SVMs configured to service the packet; and wherein the service chain includes at least the first SVM.

12. The one or more non-transitory computer-readable storage media of claim 11, wherein the VTEP-label is generated and assigned to a VTEP by a management plane; and wherein the source VTEP-label is associated with a MAC address and an IP address of the VTEP.

13. The one or more non-transitory computer-readable storage media of claim 12, storing additional instructions for:
determining, at an ingress interface of the host that hosts the VM, whether the spmac in the packet header of the packet, provided to the ingress interface, is not the same as an inner destination MAC address in the packet;
in response to determining that the spmac in the packet header of the packet, provided to the ingress interface, is not the same as the inner destination MAC address in the packet:
learning the mapping of the spmac to the VTEP-label; and
causing providing the packet from the ingress interface of the host that hosts the VM to the VM of the service chain.

14. The one or more non-transitory computer-readable storage media of claim 13, storing additional instructions for:
in response to determining, at the ingress interface of the host that hosts the VM, that the spmac in the packet header of the packet, provided to the ingress interface, is the same as the inner destination MAC address in the packet:
omitting learning the mapping of the spmac to the VTEP-label; and
causing providing the packet from the ingress interface of the host that hosts the VM to the GVM.

15. A hypervisor implemented in a computer network and configured to implement mechanisms for identifying a source location of a packet-originating guest virtual machine in a service chaining topology, the hypervisor comprising:
one or more processors;
one or more memory units; and
one or more non-transitory computer-readable storage media storing one or more computer instructions which, when executed by the one or more processors, cause the one or more processors to perform:
determining, at an egress interface of a host that hosts a virtual machine ("VM"), whether a service plane MAC address ("spmac") in a packet header of a packet, provided to the egress interface, is the same as an inner destination MAC address in the packet;
in response to determining that the spmac in the packet header of the packet, provided to the egress interface, is the same as the inner destination MAC address in the packet:
encapsulating the packet with a destination virtual tunnel endpoint ("VTEP") address retrieved from a mapping of VTEP-labels onto VTEP addresses; and
causing providing the packet from the egress interface of the host that hosts the VM to a source host that hosts a source guest virtual machine ("GVM").

16. The hypervisor of claim 15, storing additional instructions for:
in response to determining that the spmac in the packet header of the packet, provided to the egress interface, is not the same as the inner destination MAC address in the packet:
determining, at the egress interface of the host that hosts the VM, whether the spmac in the packet header of the packet, provided to the egress interface, is the same as an inner source MAC address in the packet header;
in response to determining that the spmac in the packet header of the packet, provided to the egress interface, is the same as the inner source MAC address in the packet header:
encapsulating the packet with a source VTEP-label of the host; and
causing providing the packet from the egress interface of the host that hosts the VM to a first service host that hosts a first service virtual machine ("SVM") in a service chain.

17. The hypervisor of claim 16, storing additional instructions for:
in response to determining, at the egress interface of the host that hosts the VM, that the spmac in the packet header of the packet, provided to the egress interface, is not the same as the inner source MAC address in the packet header:
encapsulating the packet with a source VTEP-label retrieved the mapping of VTEP-labels onto VTEP addresses; and
causing providing the packet from the egress interface of the host that hosts the VM to a second service host that hosts a second SVM of the service chain.

18. The hypervisor of claim 17, wherein encapsulating the packet with a label comprises including the label in an option field of a Geneve header and adding the Geneve header to the packet; wherein the service chain includes one or more SVMs configured to service the packet;
and wherein the service chain includes at least the first SVM.

19. The hypervisor of claim 18, storing additional instructions for:
determining, at an ingress interface of the host that hosts the VM, whether the spmac in the packet header of the packet, provided to the ingress interface, is not the same as an inner destination MAC address in the packet;
in response to determining that the spmac in the packet header of the packet, provided to the ingress interface, is not the same as the inner destination MAC address in the packet:
learning the mapping of the spmac to the VTEP-label; and causing providing the packet from the ingress interface of the host that hosts the VM to the VM of the service chain.

20. The hypervisor of claim 19, storing additional instructions for:
in response to determining, at the ingress interface of the host that hosts the VM, that the spmac in the packet header of the packet, provided to the ingress interface, is the same as the inner destination MAC address in the packet:
omitting learning the mapping of the spmac to the VTEP-label; and
causing providing the packet from the ingress interface of the host that hosts the VM to the GVM.

* * * * *